United States Patent
Hirai

(10) Patent No.: US 12,500,660 B2
(45) Date of Patent: Dec. 16, 2025

(54) CONTROL DEVICE, SYSTEM, COMPUTER-READABLE STORAGE MEDIUM, AND CONTROL METHOD

(71) Applicant: SOFTBANK CORP., Minato-ku (JP)

(72) Inventor: Ryoji Hirai, Chiba (JP)

(73) Assignee: SoftBank Corp., Tokyo (JP)

(*) Notice: Subject to any disclaimer, the term of this patent is extended or adjusted under 35 U.S.C. 154(b) by 533 days.

(21) Appl. No.: 17/985,141

(22) Filed: Nov. 10, 2022

(65) Prior Publication Data

US 2023/0075260 A1 Mar. 9, 2023

Related U.S. Application Data

(63) Continuation of application No. PCT/JP2021/013152, filed on Mar. 26, 2021.

(30) Foreign Application Priority Data

May 28, 2020 (JP) ................................. 2020-093391

(51) Int. Cl.
  *H04B 7/185* (2006.01)
  *H04W 72/04* (2023.01)
  *B64U 50/31* (2023.01)
  *B64U 101/20* (2023.01)

(52) U.S. Cl.
  CPC ........ *H04B 7/18504* (2013.01); *H04W 72/04* (2013.01); *B64U 50/31* (2023.01); *B64U 2101/20* (2023.01); *B64U 2201/20* (2023.01)

(58) Field of Classification Search
  CPC .................................................. H04B 7/18504
  USPC ......................................................... 370/316
  See application file for complete search history.

(56) References Cited

U.S. PATENT DOCUMENTS

| 2011/0065396 | A1 | 3/2011 | Hirata |
| 2016/0174084 | A1 | 6/2016 | Kimura |
| 2017/0353960 | A1* | 12/2017 | Heninwolf ............ H04W 72/23 |

(Continued)

FOREIGN PATENT DOCUMENTS

| JP | 2011066593 A | 3/2011 |
| JP | 2016116110 A | 6/2016 |

(Continued)

OTHER PUBLICATIONS

Extended European Search Report for counterpart European Application No. 21813207.4, issued by the European Patent Office on Jun. 18, 2024.

(Continued)

*Primary Examiner* — Temica M Beamer

(57) ABSTRACT

There is provided a control device that is configured to control an aircraft which has a battery, and a base station unit for providing a wireless communication service to a user terminal in a communication area formed by using power of the battery to radiate a beam on a ground, and which is configured to use the power of the battery to fly, the control device including: a battery capacity acquisition unit configured to acquire a battery capacity of the battery; and a communication control unit configured to control an amount of communication resources which is allocated to the user terminal by the base station unit based on the battery capacity.

16 Claims, 11 Drawing Sheets

(56) References Cited

U.S. PATENT DOCUMENTS

2021/0050910 A1 2/2021 Matsuura
2021/0211929 A1 7/2021 Sai

FOREIGN PATENT DOCUMENTS

JP 2019135823 A 8/2019
WO 2020079936 A1 4/2020

OTHER PUBLICATIONS

Yan Sun et al. Optimal 3D-Trajectory Design and Resource Allocation for Solar-Powered UAV Communication Systems, IEEE Transactions on Communications, DOI: 10.1109/TCOMM.2019.2900630, June 2019, pp. 4281-4298, vol. 67, No. 6, IEEE.

Fanzi Zeng et al. Resource Allocation and Trajectory Optimization for QoE Provisioning in Energy-Efficient UAV-Enabled Wireless Networks, IEEE Transactions on Vehicular Technology, DOI: 10.1109/TVT.2020.2986776, Jul. 2020, pp. 7634-7647, vol. 69, No. 7, IEEE.

International Preliminary Report on Patentability for International Application No. PCT/JP2021/013152, issued by the International Bureau of WIPO on Nov. 17, 2022.

\* cited by examiner

CONTROL DEVICE, SYSTEM, COMPUTER-READABLE STORAGE MEDIUM, AND CONTROL METHOD

The contents of the following Japanese patent application(s) are incorporated herein by reference:
  NO. 2020-093391 filed in JP on May 28, 2020
  NO. PCT/JP2021/013152 filed in WO on Mar. 26, 2021

BACKGROUND

1. Technical Field

The present invention relates to a control device, a system, a computer-readable storage medium, and a control method.

2. Related Art

A HAPS (High Altitude Platform Station) has been known for providing a terminal with a wireless communication service by establishing a feeder link with a gateway on the ground, establishing a service link with the terminal on the ground, and relaying a communication between the gateway and the terminal (for example, refer to Patent Document 1).

PRIOR ART DOCUMENT

Patent Document

Patent Document 1: Japanese Patent Application Publication No. 2019-135823

DESCRIPTION OF EXEMPLARY EMBODIMENTS

Hereinafter, the present invention will be described through embodiments of the invention, but the following embodiments do not limit the invention according to claims. In addition, not all of the combinations of features described in the embodiments are essential to the solving means of the invention.

Figure 1:
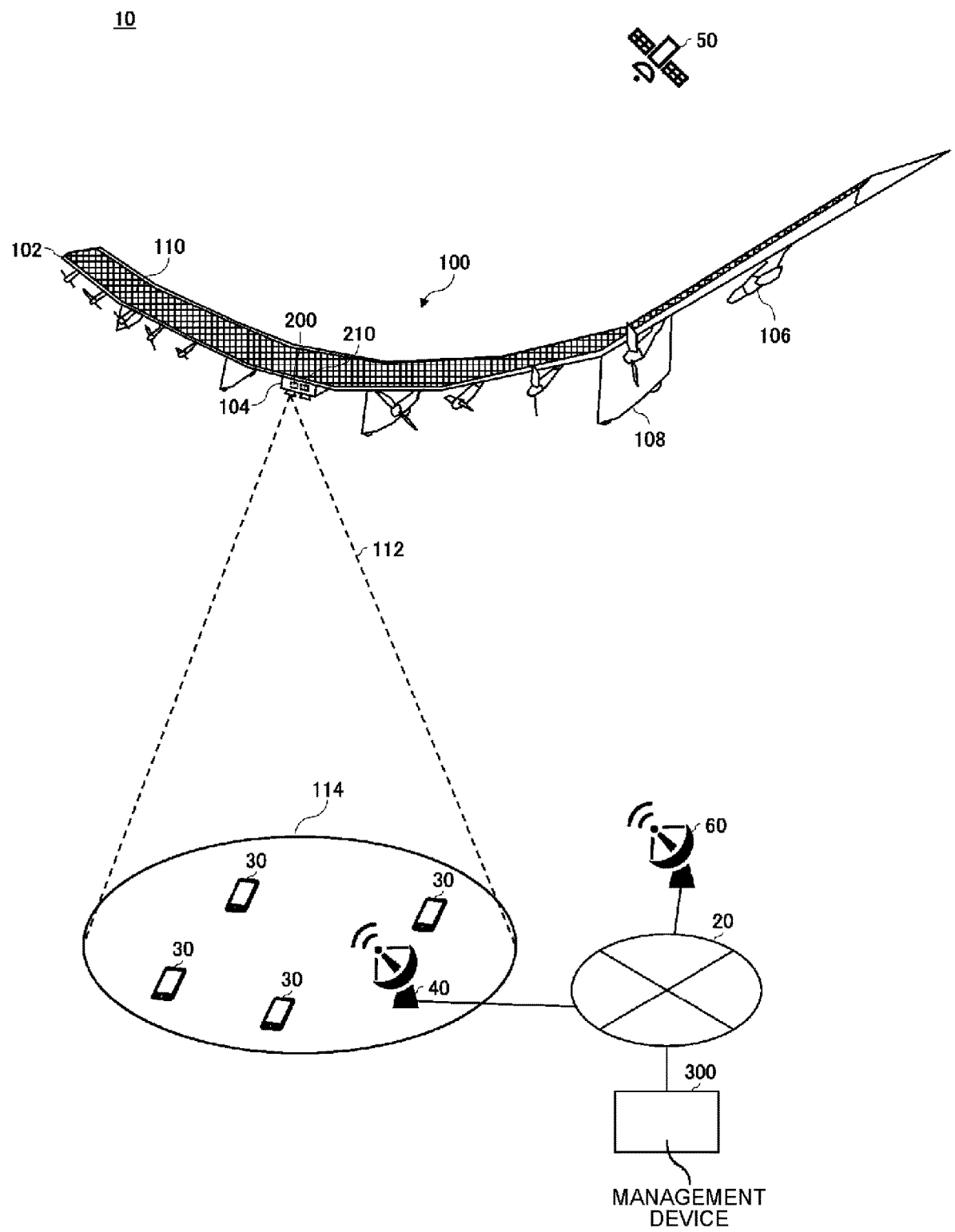
FIG. 1 schematically shows an example of a system 10.

FIG. 1 schematically shows an example of a system 10. The system 10 includes a HAPS 100 and a control device 200. The system 10 may have a management device 300.

The HAPS 100 may be an example of an aircraft which has a battery, and a base station unit 210 for providing a wireless communication service to a user terminal 30 in a communication area 114 formed by using power of the battery to radiate a beam 112 on a ground, and which is configured to use the power of a battery 120 to fly. In FIG. 1, an illustration of the battery is omitted.

The HAPS 100 includes an airframe 102, a central unit 104, a propeller 106, a pod 108, and a solar panel 110. The control device 200 and the base station unit 210 are arranged in the central unit 104. The control device 200 and the base station unit 210 may be separate, or may be integrated.

Power generated by the solar panel 110 is stored in one or more batteries arranged at least in any of the airframe 102, the central unit 104, or the pod 108. The power stored in the battery is used by each component of the HAPS 100. The solar panel 110 may be an example of a power generation unit. Another example of the power generation unit includes a fuel power generation unit, a wind power generation unit, and the like.

The control device 200 uses the power of the battery to control a flight of the HAPS 100. The control device 200 controls the flight of the HAPS 100, for example, by controlling a rotation of the propeller 106. The control device 200 may also control the flight of the HAPS 100 by changing an angle of a flap or an elevator which is not shown. The control device 200 may include various types of sensors such as a positioning sensor such as a GPS sensor, a gyro sensor, and an acceleration sensor to manage a position, a movement direction, and a movement speed of the HAPS 100.

The control device 200 uses the power of the battery to control the communication of the HAPS 100. The control device 200 uses an SL (Service Link) antenna to form the communication area 114 on the ground. The control device 200 uses the SL antenna to form a service link with the user terminal 30 on the ground. The SL antenna may be a multi-beam antenna. The cell communication area 114 may be a multi-cell area.

The control device 200 may use a FL (Feeder Link) antenna to form a feeder link with a gateway 40 on the ground. The control device 200 may access a network 20 via the gateway 40.

The control device 200 may use a satellite communication antenna to communicate with a communication satellite 50. The control device 200 may access the network 20 via the communication satellite 50 and a satellite communication station 60.

The user terminal 30 may be any communication terminal as long as the user terminal 30 is able to communicate with the HAPS 100. For example, the user terminal 30 is a mobile phone such as a smartphone. The user terminal 30 may be a tablet terminal, a PC (Personal Computer), and the like. The user terminal 30 may also be a so-called IoT (Internet of Thing) device. The user terminal 30 may include anything that corresponds to a so-called IoE (Internet of Everything).

The HAPS 100 relays a communication between the network 20 and the user terminal 30, for example, via the feeder link or the communication satellite 50, and the service link. The HAPS 100 may provide the wireless communication service to the user terminal 30 by relaying the communication between the user terminal 30 and the network 20.

The network 20 includes a mobile communication network. The mobile communication network may conform to any of the 3G (3rd Generation) communication system, the LTE (Long Term Evolution) communication system, the 5G (5th Generation) communication system, and the 6G (6th Generation) communication system and the communication system of the subsequent generation. The network 20 may include the Internet.

For example, the HAPS 100 transmits data received from the user terminal 30 in the communication area 114 to the network 20. In addition, for example, when the HAPS 100 receives data addressed to the user terminal 30 in the communication area 114, via the network 20, the HAPS 100 transmits the data to the user terminal 30.

The management device 300 manages a plurality of the HAPS 100. The management device 300 may communicate with the HAPS 100 via the network 20 and the gateway 40. The management device 300 may communicate with the HAPS 100 via the network 20, the satellite communication station 60, and the communication satellite 50.

The management device 300 controls the HAPS 100 by transmitting an instruction. The management device 300 may cause the HAPS 100 to circle over a target area such that the target area on the ground is covered by the communication area 114. For example, the HAPS 100 maintains the feeder link with the gateway 40 by adjusting a pointing direction of the FL antenna while flying in a circular orbit over the target area, and maintains the coverage of the target area by the communication area 114 by adjusting a pointing direction of the SL antenna.

Figure 2:
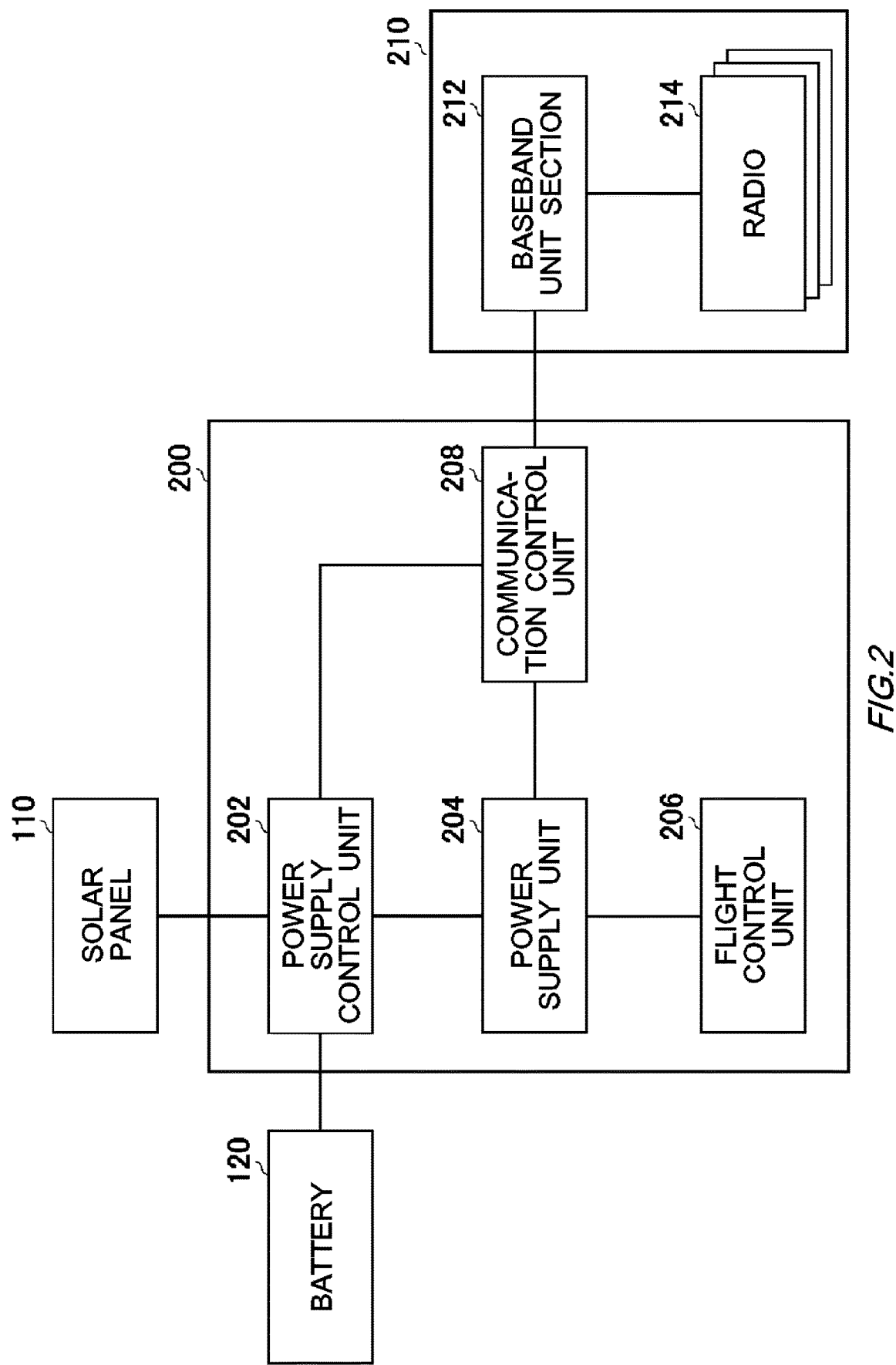
FIG. 2 schematically shows an example of a functional configuration of a control device 200.

FIG. 2 schematically shows an example of a functional configuration of a control device 200. The control device 200 includes a power supply control unit 202, a power supply unit 204, a flight control unit 206, and a communication control unit 208.

The power supply control unit 202 is connected to the solar panel 110 and the battery 120 to control the power supply unit 204. The power supply control unit 202 may supply the power generated by the solar panel 110 to the flight control unit 206 and the communication control unit 208 by the power supply unit 204. The power supply control unit 202 may supply the power generated by the solar panel 110 to the battery 120 to charge the battery 120.

For example, during daytime hours, the power supply control unit 202 performs the control to supply the power generated by the solar panel 110 to the flight control unit 206 and the communication control unit 208, or to supply the power to the battery 120. For example, during nighttime hours, the power supply control unit 202 performs the control to supply the power from the battery 120 to the flight control unit 206 and the communication control unit 208.

The power supply control unit 202 acquires and manages a battery capacity of the battery 120. The power supply control unit 202 may be an example of a battery capacity acquisition unit. The power supply control unit 202 notifies the communication control unit 208 of the battery capacity of the battery 120.

The flight control unit 206 controls the flight of the HAPS 100. The flight control unit 206 may use the power generated by the solar panel 110. The flight control unit 206 may use the power of the battery 120. The flight control unit 206 controls the flight of the HAPS 100, for example, by controlling a rotation of the propeller 106. The flight control unit 206 may also control the flight of the HAPS 100 by changing the angle of the flap or the elevator. The flight control unit 206 may include various types of sensors such as a positioning sensor such as a GPS sensor, a gyro sensor, and an acceleration sensor to manage a position, a movement direction, and a movement speed of the HAPS 100.

The communication control unit 208 controls the communication of the HAPS 100. The communication control unit 208 may control the FL antenna. The communication control unit 208 may control the SL antenna. The communication control unit 208 may control the satellite communication antenna.

The communication control unit 208 according to the present embodiment is configured to control an amount of communication resources which are allocated to the user terminal 30 by the base station unit 210 based on the battery capacity notified from the power supply control unit 202. The base station unit 210 has a baseband unit section 212 and a plurality of radios 214. The baseband unit section 212 may be a so-called BBU (BaseBand Unit), and the radio 214 may be a so-called RRH (Remote Radio Head). The communication control unit 208 may limit a resource on a radio 214 side based on the battery capacity notified from the power supply control unit 202.

The communication control unit 208 is configured to start limiting allocation of a communication resource in accordance with the battery capacity becoming lower than a first limitation threshold value. For example, the communication control unit 208 is configured to lower, in accordance with the battery capacity becoming lower than the first limitation threshold value, an upper limit of the communication resource which is allocated to the user terminal 30 in comparison with a case where the battery capacity is higher than the first limitation threshold value. This makes it possible to reduce an amount of use of the battery 120 by the base station unit 210.

Drive energy of the HAPS 100 is mainly the power supplied from the solar panel 110 during the daytime, and the power from the battery 120 charged during the daytime is used for a drive at the nighttime when the supply from the solar panel 110 is cut off. The base station unit 210 mounted on the HAPS 100 also operates by using the power from the solar panel 110 during the daytime and from the battery 120 at nighttime, but uses the power in common for the airframe drive, and thus when a large amount of power is used on a base station unit 210 side, there is a risk that the supply of drive energy stops, and in a worst case, an airframe control is not possible, thereby causing a crash.

Normally, a design is made by calculating the power required for an airframe side and the power required for the base station unit 210 side, for the power to be sufficient for an operation; however, an insufficient charge of the battery 120 or the like may occur due to a deterioration of the solar panel 110, a deterioration of the battery 120, a lack of sunlight during the daytime, or the like, and thus, in such an unforeseen situation, it is necessary to give a priority to the airframe drive and suppress a power consumption of the base station unit 210. With the communication control unit 208 according to the present embodiment, by limiting the allocation of the communication resource in accordance with a decrease in battery capacity, a communication quality somewhat decreases; however, it is possible to reduce a possibility of an occurrence of a situation where the battery capacity is depleted and it becomes difficult to continue the flight, while a provision of the wireless communication service is maintained.

The communication control unit 208 may start limiting the allocation of the communication resource in accordance with the battery capacity becoming lower than the first limitation threshold value, and then increase, in a stepwise manner, the limitation of the allocation of the communication resource in accordance with a decrease of the battery capacity. This makes it possible to reduce a speed of the power consumption while the provision of wireless communication services is maintained when the battery capacity continues to decrease even though the power consumption is suppressed by limiting the allocation of the resource.

The communication control unit 208 may limit the allocation of the communication resource and reduce a maximum number of users capable of connecting to the base station unit 210. It is possible to conceive that congestion occurs in the communication area 114 by limiting the allocation of the communication resource. This is because the communication resource is reduced even though a behavior of the user terminal 30 in the communication area 114 does not change. For example, in a case where an assumption is that the normal maximum number of users capable of the connections is 1000 and the allocation of the communication resource is 50%, the communication control unit 208 reduces, to 500, the maximum number of users capable of the connections. This makes it possible to contribute to avoiding the congestion.

It should be noted that in a case where the number of connected users exceeds the reduced maximum number of users capable of the connections, the communication control unit 208 may impose an access restriction for the reduced maximum number not to be exceeded. For example, in a case where an assumption is that the maximum number of users capable of the connections is 500, when 600 user terminals 30 are connected, the access restriction can be imposed to reduce the number of connected users by the access restriction of 20%, by taking a margin into account.

The communication control unit 208 may start limiting the allocation of the communication resource, and then stop limiting the allocation of the communication resource, in accordance with the battery capacity becoming higher than a first recovery threshold value which is higher than the first limitation threshold value. By stopping limiting the allocation of the communication resource in accordance with the battery capacity becoming higher than the first recovery threshold value, which is higher than the first limitation threshold value, rather than the first limitation threshold value, it is possible to reduce a possibility that a switch between performing and stopping of limiting the communication resource occurs consecutively in a short period of time.

The communication control unit 208 may limit power supply from the battery 120 to the base station unit 210 in accordance with the battery capacity becoming lower than a second limitation threshold value which is lower than the first limitation threshold value. For example, the communication control unit 208 may stop the power supply from the battery 120 to the base station unit 210 in accordance with the battery capacity becoming lower than the second limitation threshold value which is lower than the first limitation threshold value. The communication control unit 208 may reduce an amount of the power supply from the battery 120 to the base station unit 210 in accordance with the battery capacity becoming lower than the second limitation threshold value which is lower than the first limitation threshold value. This makes it possible to limit the power consumption of the battery 120 to only a flight control by the flight control unit 206, and makes it possible to contribute to the reduction of the consumption speed of the battery 120, and a recovery of the capacity of the battery 120.

The communication control unit 208 may stop the limitation of the power supply from the battery 120 to the base station unit 210, in accordance with the battery capacity, which has been lower than the second limitation threshold value, becoming higher than a second recovery threshold value which is higher than the second limitation threshold value. By stopping limiting the power supply to base station unit 210 in accordance with the battery capacity becoming higher than the second recovery threshold value, which is higher than the second limitation threshold value, rather than the second limitation threshold value, it is possible to reduce a possibility that a switch between performing and stopping of limiting the power supply occurs consecutively in a short period of time.

The communication control unit 208 may acquire power-related information which relates to the power of the battery. The communication control unit 208 acquires, for example, information indicating an amount of power generated by the solar panel 110, from the power supply control unit 202. In addition, the communication control unit 208 acquires, for example, weather information of the airspace in which the HAPS 100 flies, from a weather information server that provides weather information on the network 20 via the feeder link or the communication satellite 50.

The communication control unit 208 may adjust at least any of the first limitation threshold value, the first recovery threshold value, the second limitation threshold value, or the second recovery threshold value, based on the power-related information. For example, when the amount of power generated by the solar panel 110 is higher than a predetermined threshold value, the communication control unit 208 reduces at least any of the first recovery threshold value or the second recovery threshold value. In addition, for example, when an amount of the motive power consumption by the flight control unit 206 is determined to be higher than a predetermined threshold value, from the weather information of the airspace in which the HAPS 100 flies, the communication control unit 208 reduces at least any of the first limitation threshold value or the second limitation threshold value. In this way, by adjusting various threshold values in advance in accordance with a current prediction and a future prediction based on the power-related information, it is possible to be able to respond more promptly to a change in a situation.

Figure 3:
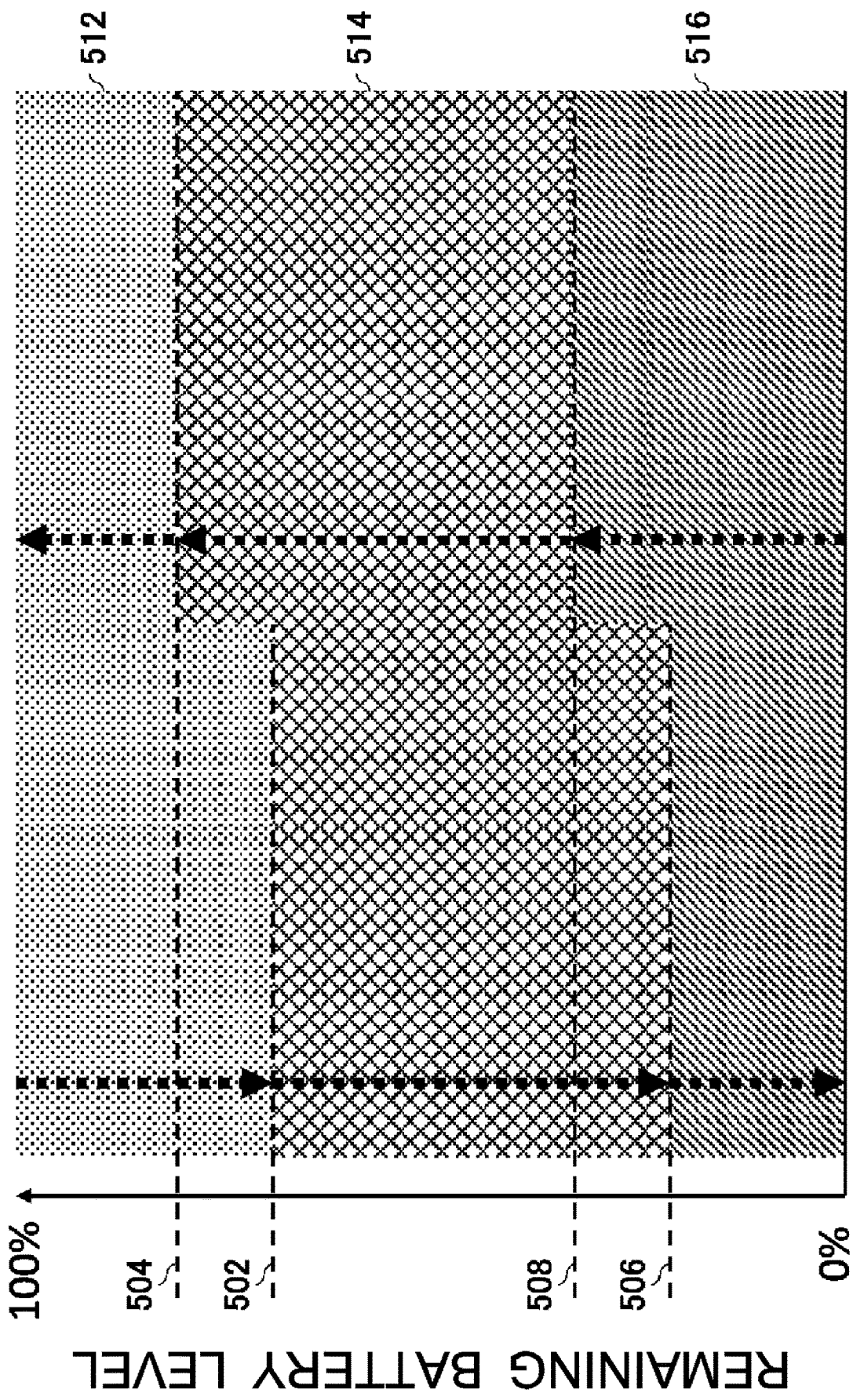
FIG. 3 is an illustration for describing an operation switch by the control device 200.

FIG. 3 is an illustration for describing an operation switch by the communication control unit 208. The communication control unit 208 switches between a normal operation 512, a limitation operation 514, and a power supply cutoff 516, based on the battery capacity of the battery 120.

The normal operation 512 may be an operation of supplying the power to all of the baseband unit sections 212 and the radios 214 to execute the communication without limiting the communication resource. The limitation operation 514 may be an operation of supplying the power to all of the baseband unit sections 212 and the radios 214, while limiting the communication resource on the radio 214 side. The communication control unit 208 may perform the limitation operation 514 when it is desired to perform an operation of balancing the recovery of the battery capacity of the battery 120 and the wireless communication service. The power supply cutoff 516 may be an operation of performing a power supply cutoff to cut off the power supply to all of the baseband unit sections 212 and radios 214. For example, when the battery capacity of the battery 120 is significantly reduced, the communication control unit 208 performs the power supply cutoff 516 to focus on the recovery of the battery capacity of the battery 120.

The communication control unit 208 switches from the normal operation 512 to the limitation operation 514 in accordance with a remaining battery level of the battery 120 becoming lower than a limitation threshold value 502. The limitation threshold value 502 may be an example of the first limitation threshold value. The communication control unit 208 may switch from the limitation operation 514 to the normal operation 512 in accordance with the remaining battery level becoming higher than a recovery threshold value 504. The recovery threshold value 504 may be an example of the first recovery threshold value.

The communication control unit 208 switches to the power supply cutoff 516 in accordance with the remaining battery level becoming lower than a limitation threshold value 506. The limitation threshold value 506 may be an example of the second limitation threshold value. The communication control unit 208 may switch to the limitation operation 514 in accordance with the remaining battery level becoming higher than a recovery threshold value 508. The recovery threshold value 508 may be an example of the second recovery threshold value.

Figure 4:
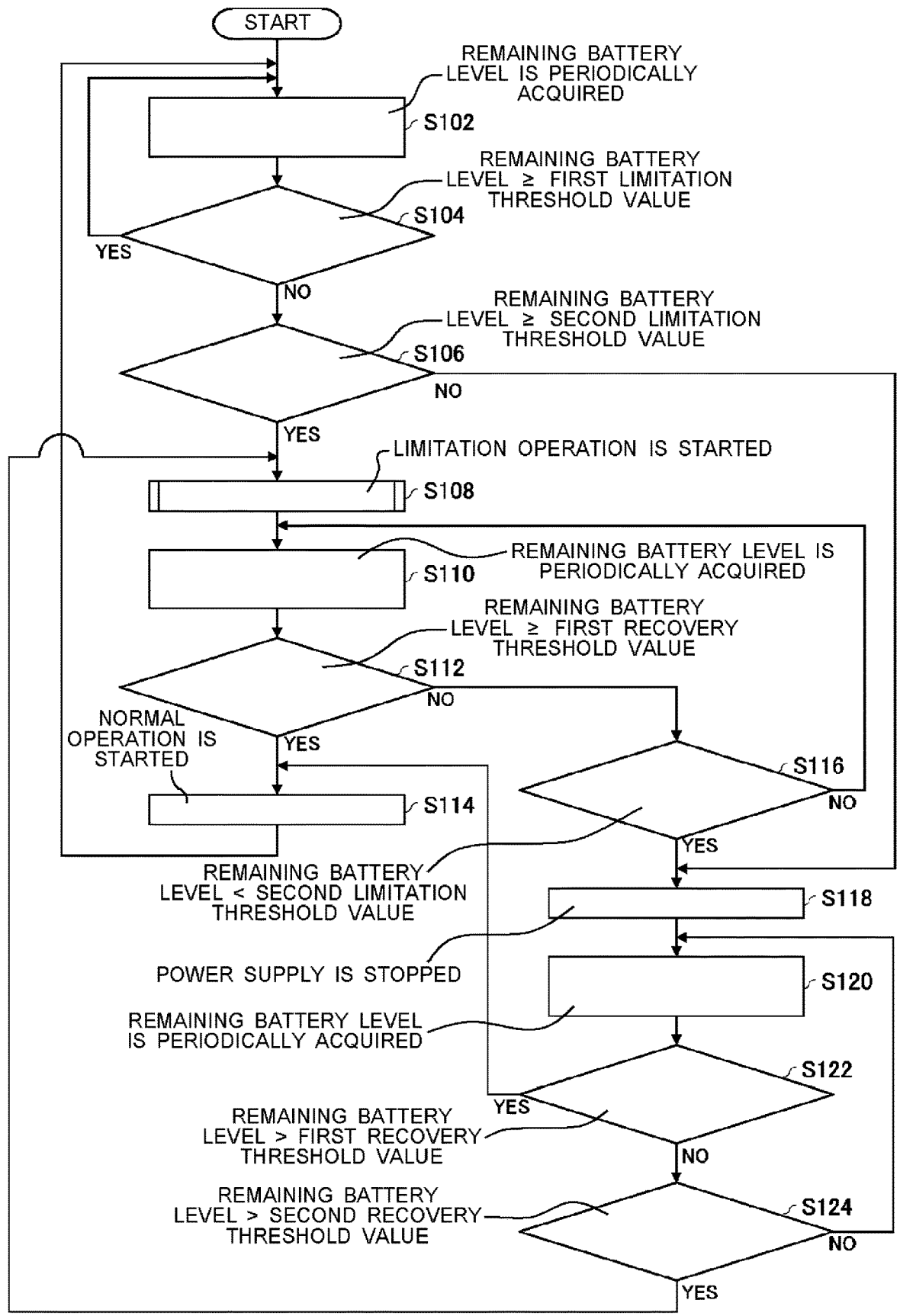
FIG. 4 schematically shows an example of a processing flow by the control device 200.

FIG. 4 schematically shows an example of a processing flow by the communication control unit 208. Here, a state in which the first limitation threshold value, the second limitation threshold value, the first recovery threshold value, the second recovery threshold value, a determination period for comparing the remaining battery level with each threshold value, a resource limiting step value, a resource limiting lower limit value, the maximum number of users capable of the connections, and a margin for the limitation are set, and an operation is in a normal state, will be described to be a start state. Each value may be set by an administrator of the HAPS 100, an administrator of the control device 200, and the like.

In step (the step may be abbreviated as S) 102, the communication control unit 208 periodically acquires the remaining battery level from the power supply control unit 202. The communication control unit 208 proceeds to S104 in accordance with an expiration of the determination period.

In S104, the communication control unit 208 determines whether the remaining battery level is higher than or equal to the first limitation threshold value. If the remaining battery level is determined to be higher than or equal to the first limitation threshold value, processing returns to S102, and if the remaining battery level is determined to be lower than the first limitation threshold value, the processing proceeds to S106.

In S106, the communication control unit 208 determines whether the remaining battery level is higher than or equal to the second limitation threshold value. If the remaining battery level is determined to be higher than or equal to the second limitation threshold value, the processing proceeds to S108, and if the remaining battery level is determined to be lower than the second limitation threshold value, the processing proceeds to S118.

In S108, the communication control unit 208 starts the limitation operation. In S110, the communication control unit 208 periodically acquires the remaining battery level from the power supply control unit 202. The communication control unit 208 proceeds to S112 in accordance with an expiration of the determination period.

In S112, the communication control unit 208 determines whether the remaining battery level is higher than or equal to the first recovery threshold value. If the remaining battery level is determined to be higher than or equal to the first recovery threshold value, the processing proceeds to S114, and if the remaining battery level is determined to be lower than the first recovery threshold value, the processing proceeds to S116. In S114, the communication control unit 208 starts the normal operation and returns to S102.

In S116, the communication control unit 208 determines whether the remaining battery level is lower than the second limitation threshold value. If the remaining battery level is determined to be lower than the second limitation threshold value, the processing proceeds to S118, and if the remaining battery level is determined to be higher than or equal to the second limitation threshold value, the processing returns to S110. In S118, the communication control unit 208 stops the power supply to the base station unit 210.

In S120, the communication control unit 208 periodically acquires the remaining battery level from the power supply control unit 202. The communication control unit 208 proceeds to S122 in accordance with an expiration of the determination period.

In S122, the communication control unit 208 determines whether the remaining battery level is higher than the first recovery threshold value. If the remaining battery level is determined to be higher than the first recovery threshold value, the processing returns to S114, and if the remaining battery level is determined to be lower than or equal to the first recovery threshold value, the processing proceeds to S124.

In S124, the communication control unit 208 determines whether the remaining battery level is higher than the second recovery threshold value. If the remaining battery level is determined to be higher than the second recovery threshold value, the processing returns to S108, and if the remaining battery level is determined to be lower than or equal to the second recovery threshold value, the processing returns to S120.

Figure 5:
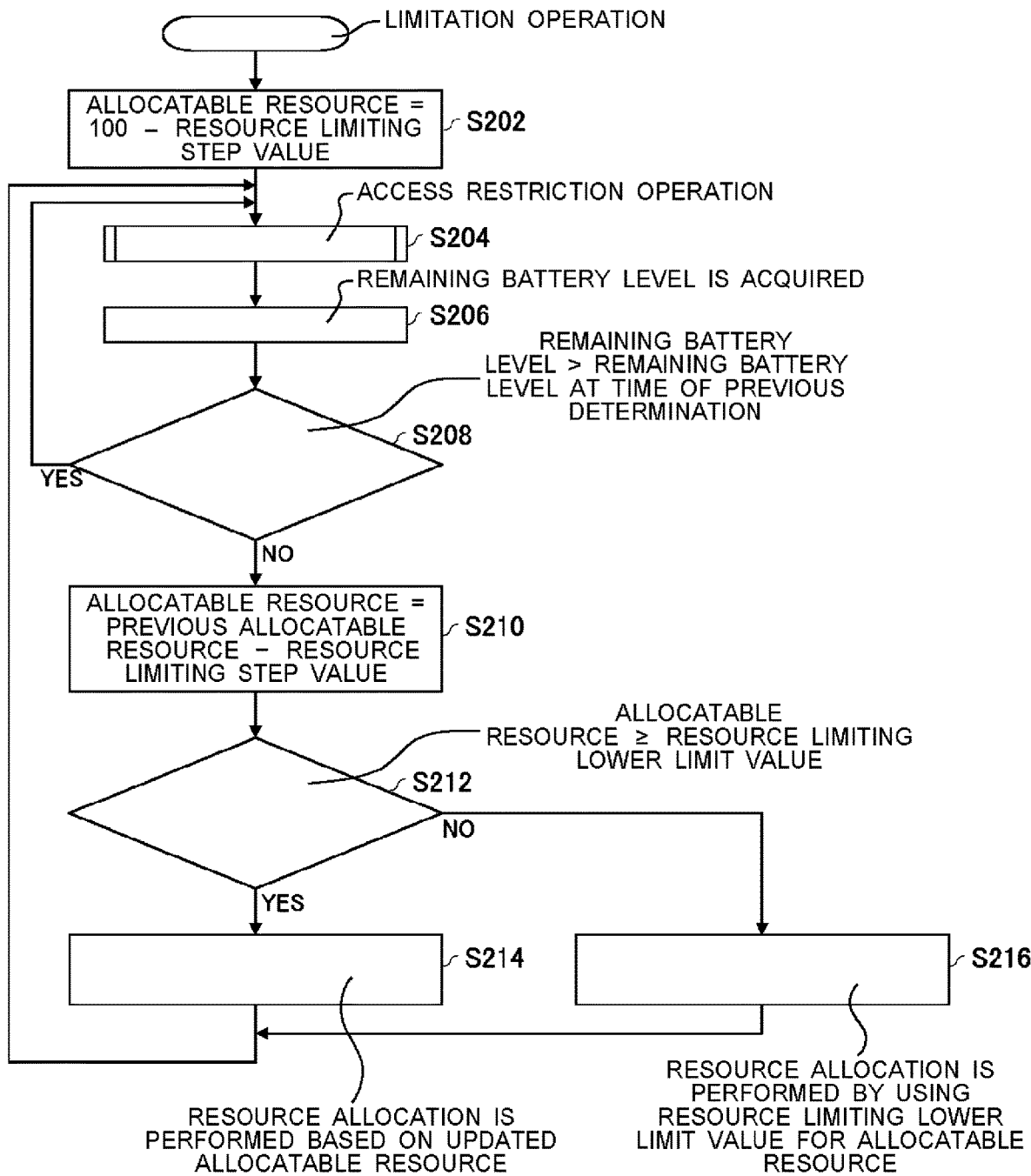
FIG. 5 schematically shows an example of the processing flow by the control device 200.

FIG. 5 schematically shows an example of a flow of the limitation operation by the communication control unit 208. In S202, the communication control unit 208 keeps "100—the resource limiting step value" for an allocatable resource, and causes the base station unit 210 to perform the resource allocation. In S204, the communication control unit 208 causes the base station unit 210 to perform an access restriction operation.

In S206, the communication control unit 208 acquires the remaining battery level of the battery 120 from the power supply control unit 202. In S208, the communication control unit 208 determines whether the acquired remaining battery level is higher than the remaining battery level at the time of the previous determination. If the acquired remaining battery level is determined to be higher, the processing returns to S204, and if the acquired remaining battery level is determined to be lower, the processing proceeds to S210.

In S210, the communication control unit 208 updates and keeps "the allocatable resource=the previous allocatable resource—the resource limiting step value". In S212, the communication control unit 208 determines whether the allocatable resource is greater than or equal to the resource limiting lower limit value. If the allocatable resource is determined to be greater than or equal to the resource limiting lower limit value, the processing proceeds to S214, and if the allocatable resource is determined to be smaller than the resource limiting lower limit value, the processing proceeds to S216.

In S214, the communication control unit 208 performs the resource allocation based on the updated allocatable resource. In S216, the communication control unit 208 performs the resource allocation by using the resource limiting lower limit value for the allocatable resource.

Figure 6:
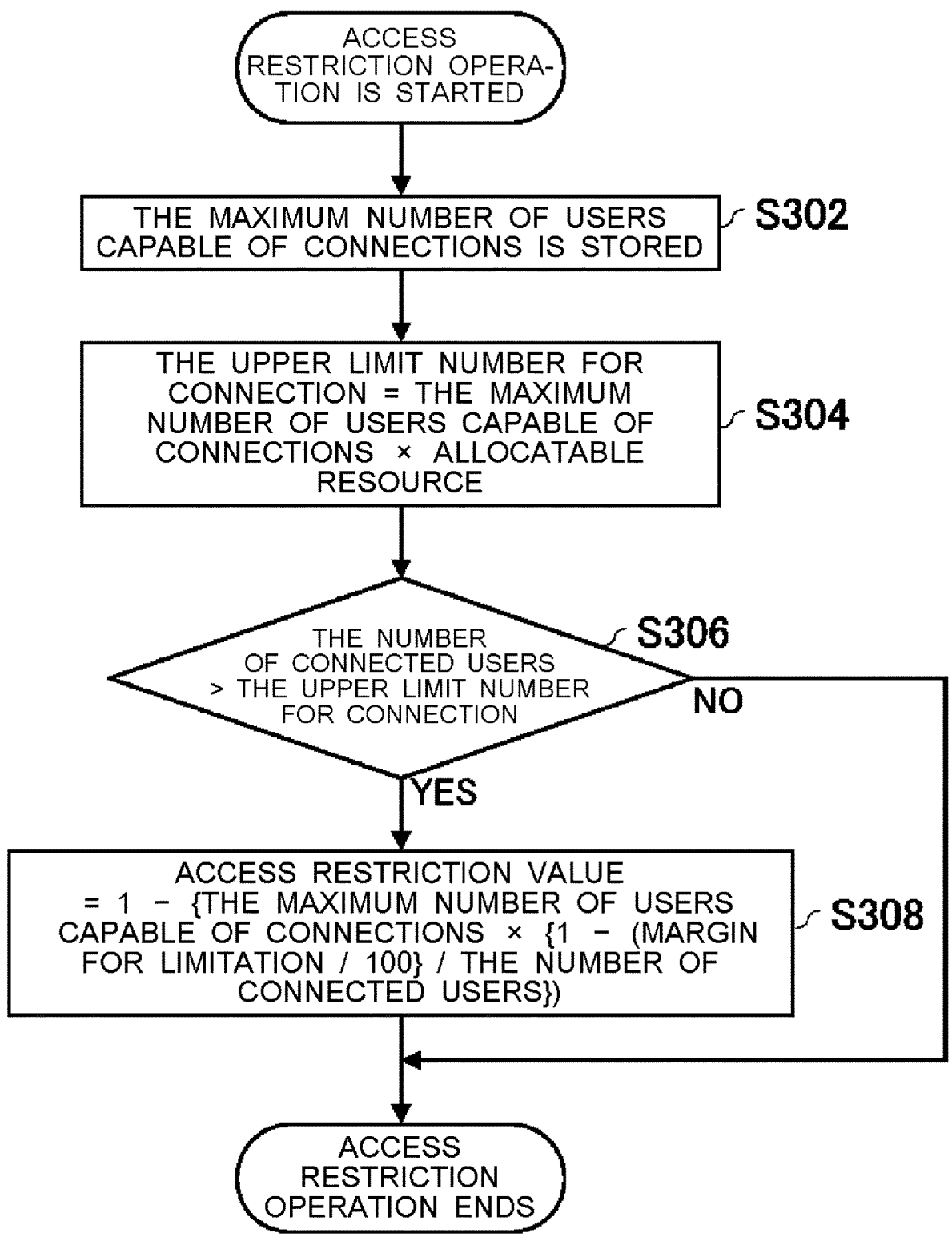
FIG. 6 schematically shows an example of the processing flow by the control device 200.

FIG. 6 schematically shows an example of the flow of the access restriction operation by the communication control unit 208. In S302, the communication control unit 208 stores the maximum number of users capable of the connections.

In S304, the communication control unit 208 stores "an upper limit number for the connection=the maximum number of users capable of the connections×the allocatable resource".

In S306, the communication control unit 208 determines whether the number of connected users is greater than the upper limit number for the connection. If the number of connected users is determined to be greater, the processing proceeds to S308. In S308, the communication control unit 208 sets "an access restriction value=1−{the maximum number of users capable of the connections×{1−(the margin for the limitation/100}/the number of connected users}). Then, the access restriction operation ends.

FIG. 7 to FIG. 10 schematically show examples of a resource allocation 600. A resource block 602 indicates a resource block to be allocated, and a resource block 604 indicates a resource block not to be allocated. A vertical axis represents a frequency and a horizontal axis represents a time. FIG. 7 to FIG. 10 illustrates a case where the allocation of the communication resource is limited to 50%.

Figure 7:
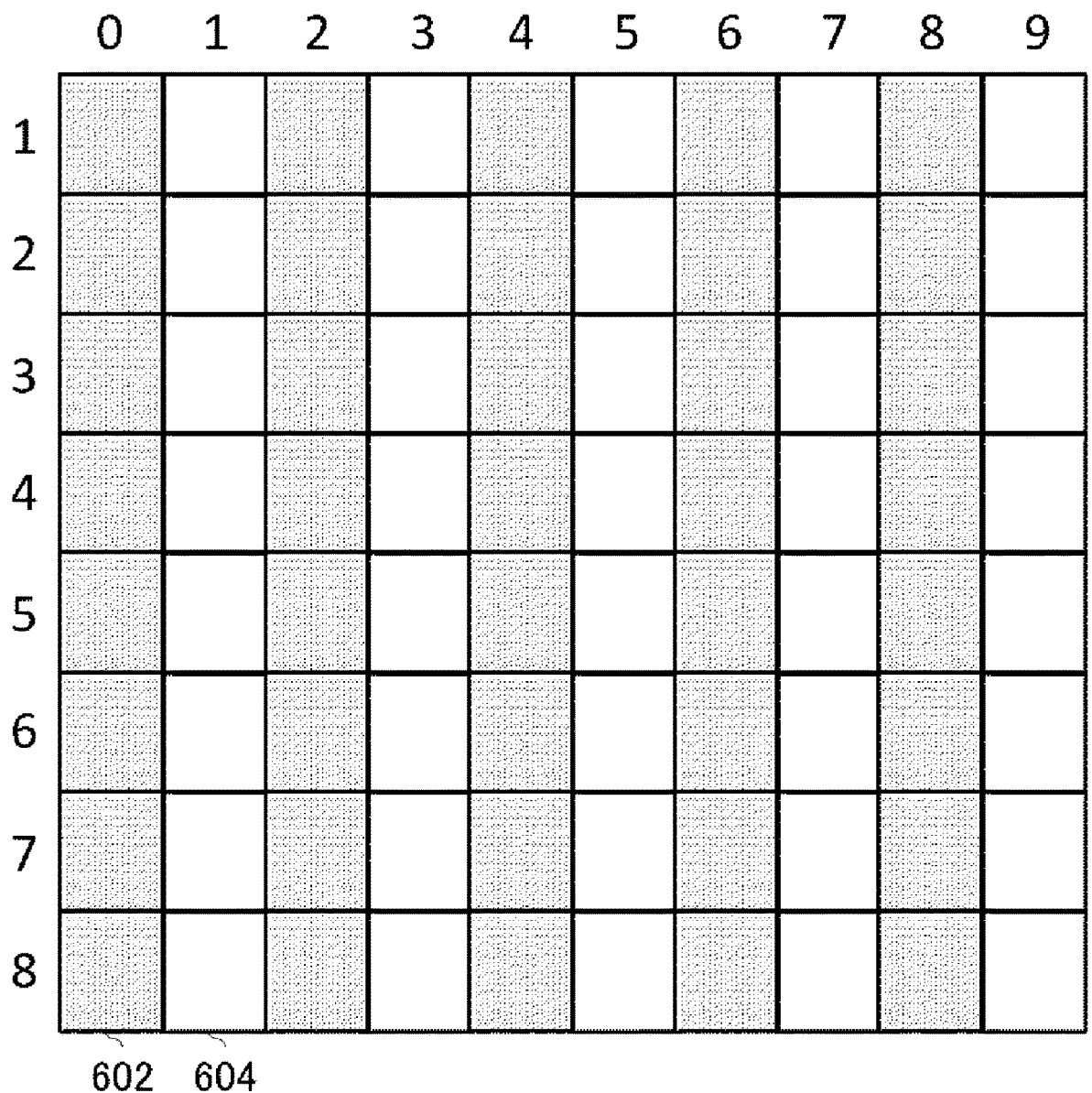
FIG. 7 schematically shows an example of a resource allocation 600.
Figure 8:
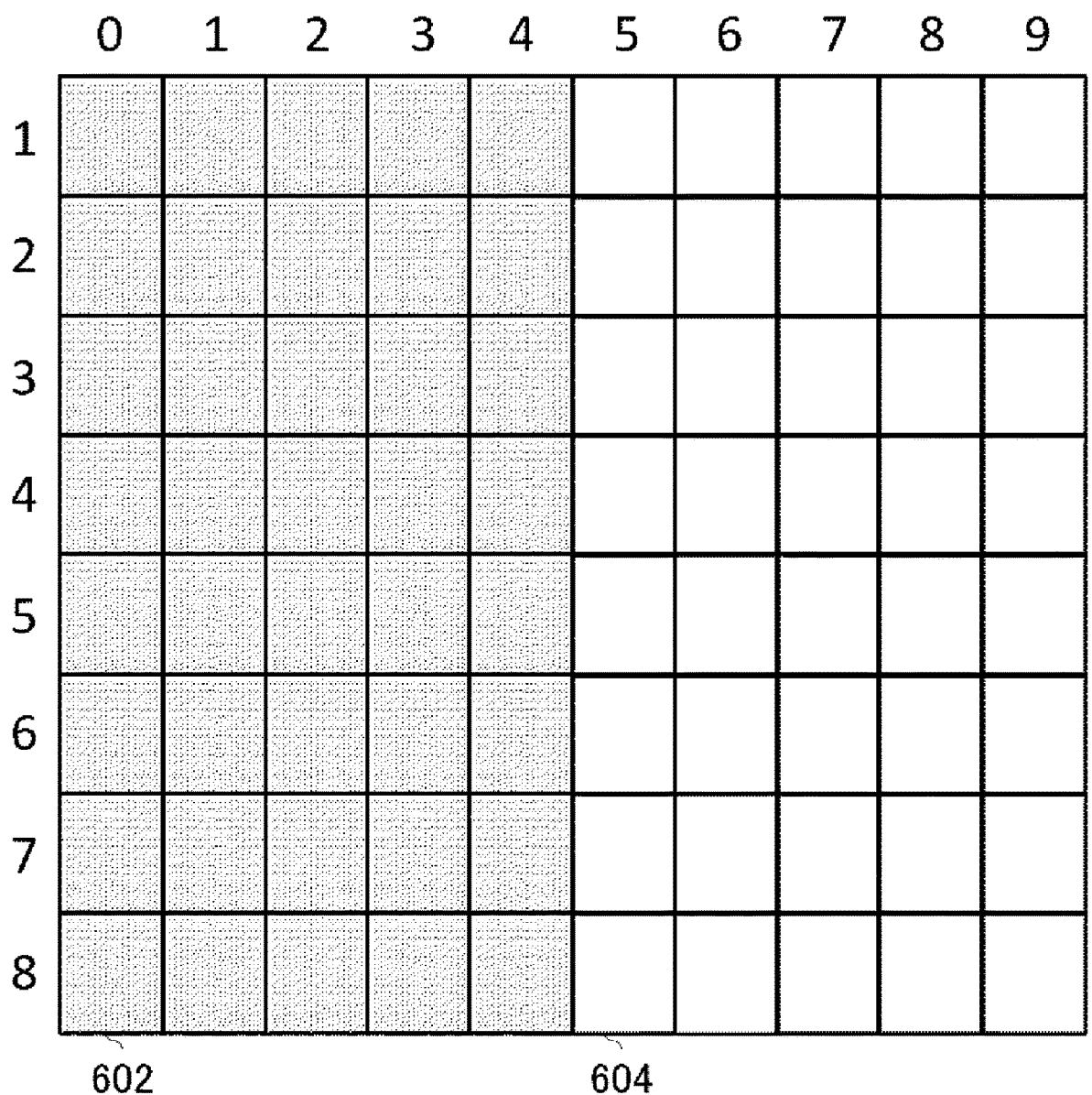
FIG. 8 schematically shows an example of the resource allocation 600.

The communication control unit 208 may limit the communication resource on the time axis. For example, as shown in FIG. 7, the communication control unit 208 performs the resource limitation by performing the allocation of the resource for each subframe on the time axis. In addition, as shown in FIG. 8, the communication control unit 208 performs the resource limitation by performing the allocation of the resource every five subframes on the time axis.

Figure 9:
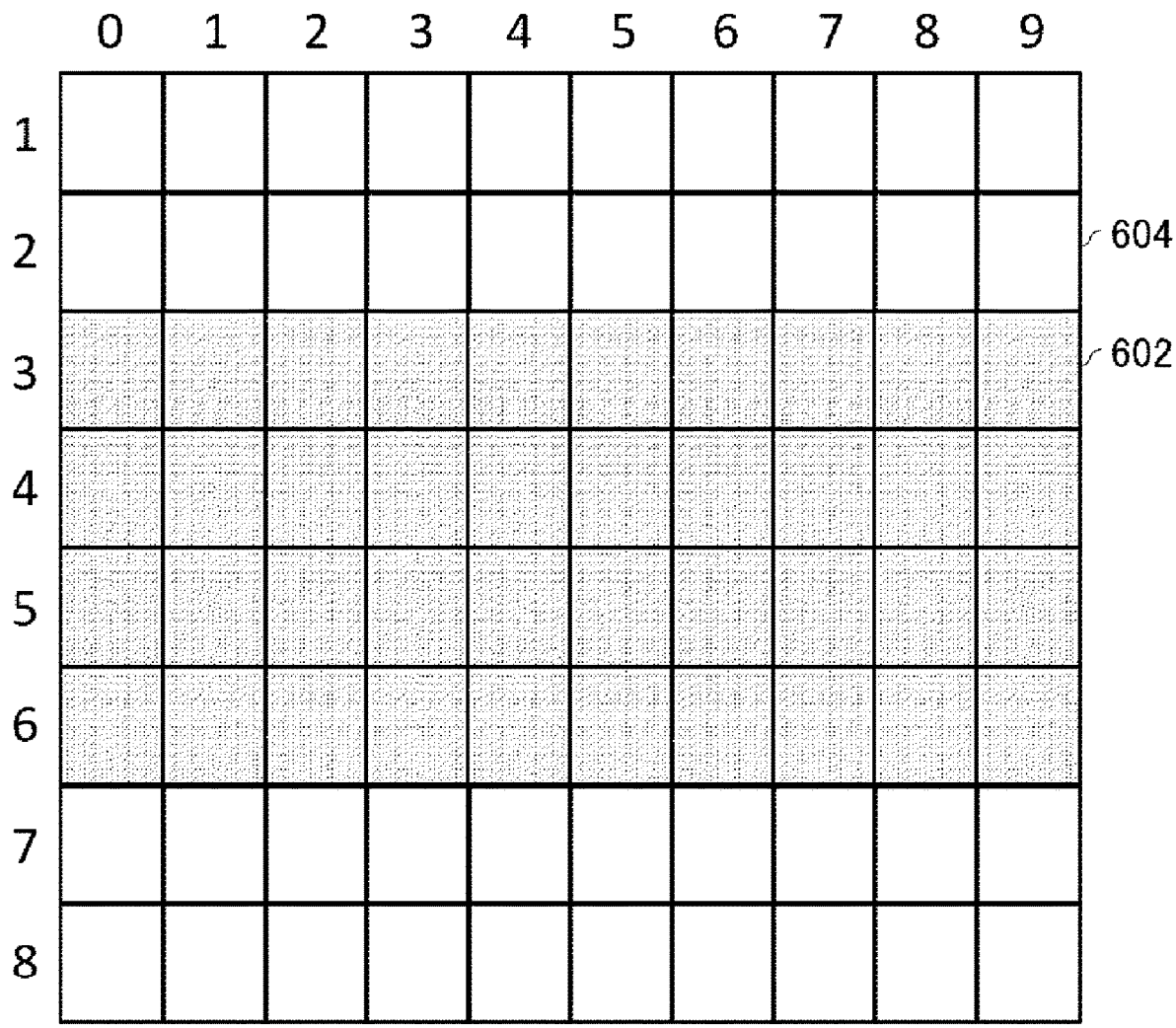
FIG. 9 schematically shows an example of the resource allocation 600.

The communication control unit 208 may limit the communication resource on the frequency axis. For example, as shown in FIG. 9, the communication control unit 208 performs the resource limitation by reducing the number of subcarriers to be allocated on the frequency axis.

Figure 10:
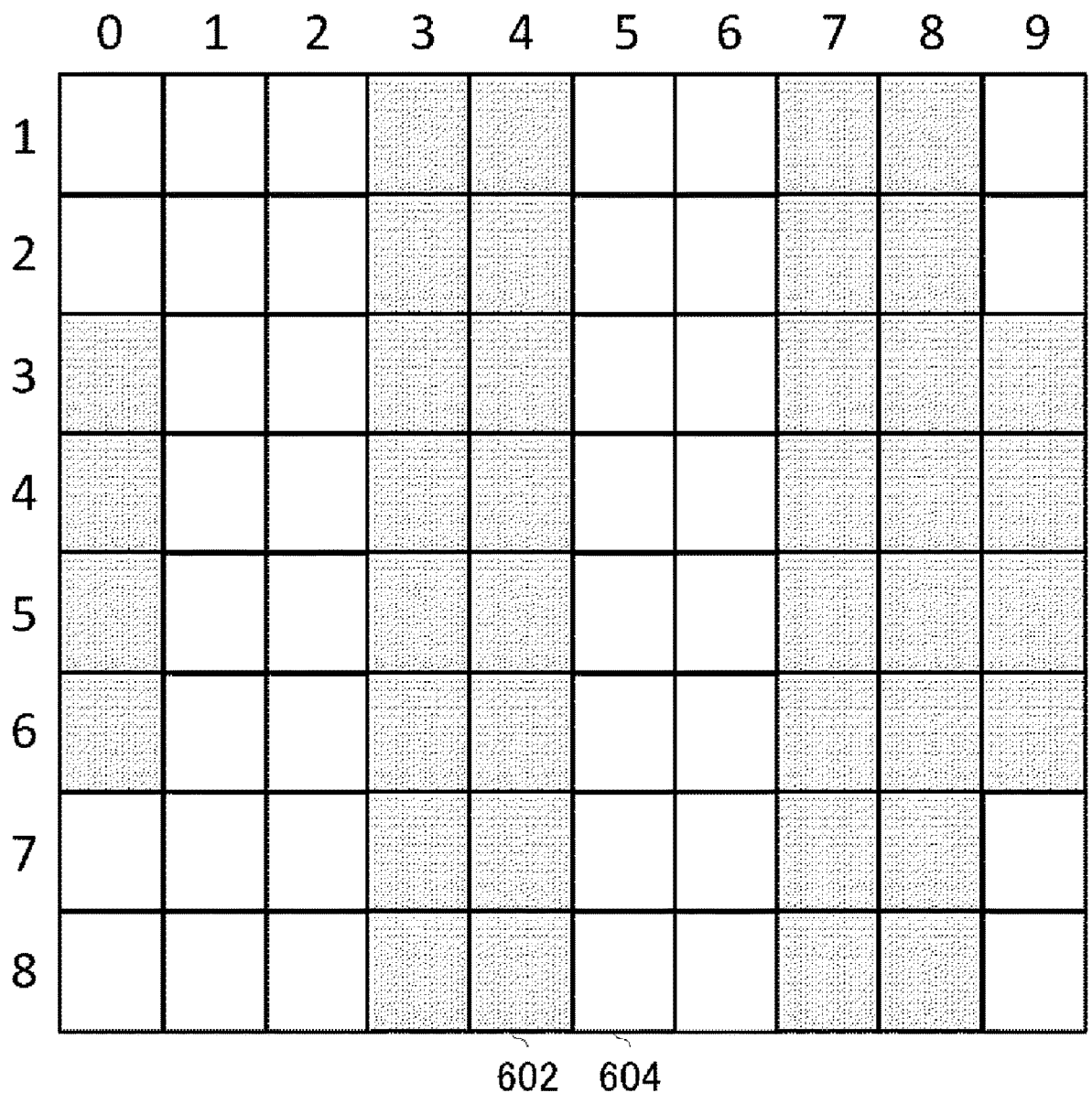
FIG. 10 schematically shows an example of the resource allocation 600.

The communication control unit 208 may limit the communication resource on the time axis and the frequency axis. For example, as shown in FIG. 10, the communication control unit 208 performs the resource limitation by combining the limitation on the time axis and the limitation on the frequency axis.

Figure 11:
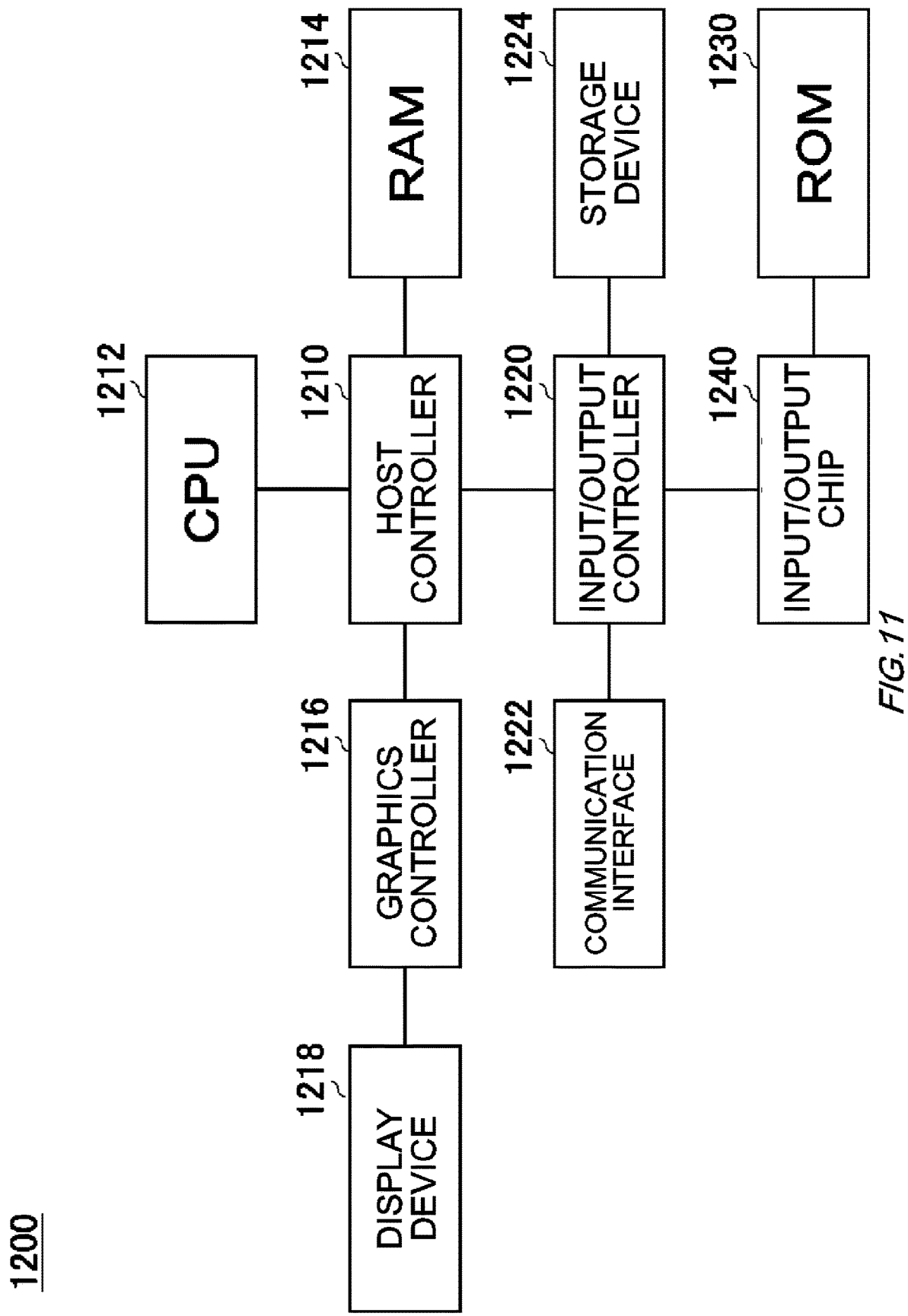
FIG. 11 schematically shows an example of a hardware configuration of a computer 1200 that functions as the control device 200.

FIG. 11 schematically shows an example of a hardware configuration of a computer 1200 that functions as the control device 200. Programs installed in the computer 1200 can cause the computer 1200 to function as one or more "units" of the device according to the present embodiment or can cause the computer 1200 to execute operations associated with the devices according to the present embodiment or the one or more "units", and/or can cause the computer 1200 to execute a process according to the present embodiment or steps of the process. Such a program may be executed by a CPU 1212 to cause the computer 1200 to perform specific operations associated with some or all of the blocks in the flowcharts and block diagrams described in the specification.

The computer 1200 according to the present embodiment includes a CPU 1212, a RAM 1214, and a graphics controller 1216, which are connected to each other via a host controller 1210. Also, the computer 1200 includes input/output units such as a communication interface 1222, a storage device 1224, a DVD drive and an IC card drive, which are connected to the host controller 1210 via an input/output controller 1220. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The IC card drive reads the program and data from the IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port or the like to the input/output controller 1220.

A program is provided by a computer-readable storage medium such as the DVD-ROM or the IC card. The program is read from the computer-readable storage medium, installed into the storage device 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. A device or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write the processed data back in the external recording medium.

Various types of programs, data, table and various types of information such as a database may be stored in a recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The program or software module described above may be stored on the computer 1200 or in a computer-readable storage medium near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent steps of processes in which operations are performed or "units" of devices responsible for performing operations. A specific step and "unit" may be implemented by dedicated circuitry, programmable circuitry supplied along with a computer-readable instruction stored on a computer-readable storage medium, and/or a processor supplied along with the computer-readable instruction stored on the computer-readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means for performing an operation specified by a flowchart or a block diagram. Examples of the computer-readable storage medium may include an electronic storage medium, a magnetic storage medium, an optical storage medium, an electromagnetic storage medium, a semiconductor storage medium, or the like. More specific examples of computer-readable storage media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a Blu-ray (registered trademark) disc, a memory stick, an integrated circuit card, etc.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer-readable instruction to provide means for performing operations specified by the flowchart or the block diagram. Examples of the processor include a computer processor, a processing unit, a microprocessor, a digital signal processor, a controller, a microcontroller, and the like.

In the embodiment described above, an example in which the control device 200 of the HAPS 100 controls the amount of communication resources which are allocated to the user terminal 30 by the base station unit 210 based on the remaining battery level of the battery of the HAPS 100, has been mainly described, but is not limited thereto. The management device 300 may control the amount of communication resources which are allocated to the user terminal 30 by the base station unit 210 based on the remaining battery level of the battery of the HAPS 100. That is, the management device 300 may function as the control device. For example, the management device 300 acquires, from the HAPS 100, the remaining battery level of the battery of the HAPS 100, and transmits, to the HAPS 100, an instruction to control the amount of communication resources which are allocated to the user terminal 30 by the base station unit 210 based on the remaining battery level.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 system, 20 network, 30 user terminal, 40 gateway, 50 communication satellite, 60 satellite communication station, 100 HAPS, 102 airframe, 104 central unit, 106 propeller, 108 pod, 110 solar panel, 120 battery, 200 control device, 202 power supply control unit, 204 power supply unit, 206 flight control unit, 208 communication control unit, 210 base station unit, 212 baseband unit section, 214 radio, 300 management device, 502 limitation threshold value, 504 recovery threshold value, 506 limitation threshold value, 508 recovery threshold value, 512 normal operation, 514 limitation operation, 516 power supply cutoff, 600 resource allocation, 602 resource block, 1200 computer, 1210 host controller, 1212 CPU, 1214 RAM, 1216 graphics controller, 1218 display device, 1220 input/output controller, 1222 communication interface, 1224 storage device, 1230 ROM, 1240 input/output chip.

What is claimed is:

1. A control device that is configured to control an aircraft which has a battery, and a base station unit for providing a wireless communication service to a user terminal in a communication area formed by using power of the battery to radiate a beam on a ground, and which is configured to use the power of the battery to fly, the control device comprising:
 a battery capacity acquisition unit configured to acquire a battery capacity of the battery; and
 a communication control unit configured to control an amount of communication resources which is allocated to the user terminal by the base station unit based on the battery capacity, wherein
 the communication control unit is further configured to limit allocation of the communication resources in accordance with the battery capacity becoming lower than a first limitation threshold value, then stops the limiting the allocation of the communication resources in accordance with the battery capacity, which had been lower than the first limitation threshold value, becoming higher than a first recovery threshold value which is higher than the first limitation threshold value, and
 the communication control unit is further configured to limit power from the battery to the base station unit in accordance with the battery capacity becoming lower than a second limitation threshold which is lower than the first limitation threshold value, then stops the limiting the power from the battery to the base station in accordance with the battery capacity, which had been lower than the second limitation threshold value, becoming higher than a second recovery threshold value which is higher than the second limitation threshold value.

2. The control device according to claim 1,
 the aircraft having a power generation unit, and
 the battery being charged with power generated by the power generation unit.

3. The control device according to claim 2, wherein
 the communication control unit is configured to lower, in accordance with the battery capacity becoming lower than the first limitation threshold value, an upper limit of the communication resource which is allocated to the user terminal in comparison with a case where the battery capacity is higher than the first limitation threshold value.

4. The control device according to claim 2, wherein
 the communication control unit is configured to start limiting the allocation of the communication resource, and then increase, in a stepwise manner, the limitation of the allocation of the communication resource in accordance with a decrease of the battery capacity.

5. The control device according to claim 3, wherein
 the communication control unit is configured to start limiting the allocation of the communication resource, and then increase, in a stepwise manner, the limitation of the allocation of the communication resource in accordance with a decrease of the battery capacity.

6. The control device according to claim 2, wherein
 the communication control unit is configured to limit the allocation of the communication resource and reduce a maximum number of users capable of connecting to the base station unit.

7. The control device according to claim 3, wherein
 the communication control unit is configured to limit the allocation of the communication resource and reduce a maximum number of users capable of connecting to the base station unit.

8. The control device according to claim 2, wherein
 the communication control unit is configured to acquire power-related information which relates to the power of the battery, and adjust the first limitation threshold value and the first recovery threshold value based on the power-related information.

9. The control device according to claim 2, wherein
 the communication control unit is configured to stop the power supply from the battery to the base station unit in accordance with the battery capacity becoming lower than the second limitation threshold value which is lower than the first limitation threshold value.

10. The control device according to claim 2, wherein
 the communication control unit is configured to stop limiting the power supply from the battery to the base station unit, in accordance with the battery capacity, which has been lower than the second limitation threshold value, becoming higher than a second recovery threshold value which is higher than the second limitation threshold value.

11. The control device according to claim 9, wherein
 the communication control unit is configured to stop limiting the power supply from the battery to the base station unit, in accordance with the battery capacity, which has been lower than the second limitation threshold value, becoming higher than a second recovery threshold value which is higher than the second limitation threshold value.

12. The control device according to claim 10, wherein
 the communication control unit is configured to acquire power-related information which relates to the power of the battery, and adjust the second limitation threshold value and the second recovery threshold value based on the power-related information.

13. A system comprising:
 the control device according to claim 1; and
 the aircraft on which the control device is mounted.

14. A system comprising:
 the control device according to claim 2; and
 the aircraft on which the control device is mounted.

15. A non-transitory computer-readable storage medium having stored thereon a program for causing a control device to perform operations, the control device being configured to control an aircraft which has a battery, and a base station unit for providing a wireless communication service to a user terminal in a communication area formed by using power of the battery to radiate a beam on a ground, and which is configured to use the power of the battery to fly, the operations comprising:
 acquiring a battery capacity of the battery;
 controlling a communication by controlling an amount of communication resources which is allocated to the user terminal by the base station unit based on the battery capacity;
 limiting allocation of the communication resources in accordance with the battery capacity becoming lower than a first limitation threshold value, then stopping the limiting the allocation of the communication resources in accordance with the battery capacity, which had been lower than the first limitation threshold value, becoming higher than a first recovery threshold value which is higher than the first limitation threshold value, and limiting power from the battery to the base station unit in accordance with the battery capacity becoming lower than a second limitation threshold which is lower than the first limitation threshold value, then stopping the limiting the power from the battery to the base station in accordance with the battery capacity, which had been lower than the second limitation threshold value, becoming higher than a second recovery threshold value which is higher than the second limitation threshold value.

16. A control method that is executed by a control device configured to control an aircraft which has a battery, and a base station unit for providing a wireless communication service to a user terminal in a communication area formed by using power of the battery to radiate a beam on a ground, and which is configured to use the power of the battery to fly, the control method comprising:
  acquiring a battery capacity of the battery;
  controlling a communication by controlling an amount of communication resources which is allocated to the user terminal by the base station unit based on the battery capacity;
  limiting allocation of the communication resources in accordance with the battery capacity becoming lower than a first limitation threshold value, then stopping the limiting the allocation of the communication resources in accordance with the battery capacity, which had been lower than the first limitation threshold value, becoming higher than a first recovery threshold value which is higher than the first limitation threshold value, and
  limiting power from the battery to the base station unit in accordance with the battery capacity becoming lower than a second limitation threshold which is lower than the first limitation threshold value, then stopping the limiting the power from the battery to the base station in accordance with the battery capacity, which had been lower than the second limitation threshold value, becoming higher than a second recovery threshold value which is higher than the second limitation threshold value.

* * * * *